United States Patent
Hoy et al.

[15] 3,668,183
[45] June 6, 1972

[54] PRODUCTION OF POLYENAMINES

[72] Inventors: Kenneth Look Hoy, St. Albans, W. Va.; Charles Leonard Milligan, Centerville, Ohio

[73] Assignee: Union Carbide Corporation, New York, N.Y.

[22] Filed: Nov. 3, 1970

[21] Appl. No.: 86,611

[52] U.S. Cl. .................................................................260/65
[51] Int. Cl. ..............................................................C08g 15/00
[58] Field of Search ........................260/63 N, 64, 65, 72

[56] References Cited

UNITED STATES PATENTS

| | | | |
|---|---|---|---|
| 3,017,388 | 1/1962 | Caldwell et al. | 260/65 |
| 3,398,103 | 8/1968 | Kuhlkamp et al. | 260/2.5 |
| 3,461,100 | 8/1969 | Payne et al. | 260/72 |
| 3,506,613 | 4/1970 | Bayer | 260/65 |

*Primary Examiner*—William H. Short
*Assistant Examiner*—L. L. Lee
*Attorney*—Paul A. Rose, Aldo John Cozzi and Francis M. Fazio

[57] ABSTRACT

Polyenamine resins useful as adhesives and in coating applications are produced from the reaction of polyacetoacetates or polyacetoacetamides with blocked polyamines. The blocked polyamines are ketimines or enamines obtained by the reaction of an amine or amide with either a ketone or an aldimine obtained by the reaction of an amine or amide with an aldehyde.

6 Claims, No Drawings

PRODUCTION OF POLYENAMINES

This invention relates to an improved process for manufacturing polyenamines. In particular, it relates to a new method for producing the polyeneamines in such manner that the polymerization can be controlled.

It has been known that the polyeneamines can be made from the reaction of polyacetoacetates or polyacetoacetamides with polyamines by mixing the compounds together in the proper proportions. However, these mixtures are noted for extremely short pot lives and also their insolubility in the common organic solvents after reaction and formation of polyenamine. The reaction is further characterized by rapid exothermic reaction rates which make the mixtures of limited utility in coating applications.

It has now been found that if the polyamines are initially blocked with a carbonyl-containing compound, i.e., with a ketone or an aldehyde, to produce the corresponding ketimine or aldimine, and that if this ketimine or aldimine is than mixed with a polyacetoacetate or polyacetoacetamide, the compositions so produced possess pot lives of sufficient duration to enable them to be used as adhesives and in coatings applications. The adhesive and coating compositions have been found to have increased solubility in many conventional organic solvents and furthermore are of low viscosity, making it possible to obtain mixtures of higher solids content.

The polyenamines produced in this invention have the following structural units in the molecule:

(I) 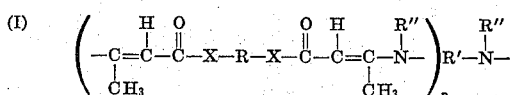

wherein R represents the base of the acetoacetate or acetoacetamide compound, X can be oxygen or nitrogen, R' represents the base of the polyamine compound used, R" is hydrogen or alkyl of one to six carbon atoms, and $n$ has a value of from 1 to 3 or higher. Both R and R' can be alkylene, cycloalkylene, arylene, arylalkylene, cycloalkylalkylene, alkylcycloalkylene, alkylarylene or any one or more of these groups linked together with etheric oxygen (—O—) moieties. R and R' can contain from one to 50 carbon atoms, preferably from one to 15 carbon atoms.

The R and R' groups can also contain non-interfering functional groups such as

reactive groups such as (—COOH), and stabilizing moieties such as (—O—), (—OH) and the like.

The polyamine used to produce the ketimine or aldimine can contain either primary or secondary amino groups which are capable of reacting with aldehydes or ketones. When an aldehyde is used as the blocking agent, an aldimine will be formed; a ketone reacted with a polyamine containing primary amino groups will give a ketimine, and a ketone of the cyclohexanone type reacted with a polyamine containing secondary amino groups will yield an enamine but for purposes of this invention are considered ketimines. Each of these intermediate products can be hydrolyzed with water or atmospheric moisture to be converted back into the polyfunctional amine and carbonyl-containing blocking agent.

Among the polyamines which can be used are those represented by the general formula:

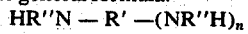    II wherein $n$, R' and R" have the same definition as in formula (I). It is clear that the polyamines are not limited to diamines, they can be tri-functional, tetrafunctional or higher. As the functionality of the polyamine increases, the number of potential reaction sites accordingly increases thus producing a more highly crosslinked and often harder polyenamine. The desired hardness of the final polyenamine is thus controllable by the skill of the artisan in the coating field.

Illustrative of suitable polyamines one can mention ethylenediamine, triethylenediamine, hexane-1,6-diamine, bis(6-aminohexyl) ether, tricyclodecane diamine, diethylenetriamine, propylenediamine, the butylenediamines, the 1,2-, 1,3- and 1,4- phenylenediamines, toluidine, methylenebisaniline, m-xylene-α,α'-diamine, N,N'-dimethylethylenediamine, N,N'-diethylethylenediamine, N,N'-dibutylpropylenediamine, N,N',N"-trimethyldiethylenetriamine, N,N'-dimethyldiethyltriamine, decane-1,10-diamine, bis(4-aminobutyl)ether, cyclohexyl-1,4-diamine, cyclohexyl-1,2,4-triamine, cyclohexyl-1,2,4-5-tetraamine, bis(N-methyl-6-aminohexyl)ether, bis(2-aminoethyl)ether, tetradecylenediamine, 3,4,5-triaminopyran, 3,4-diaminofuran, and octane-1,8-diamine. The polyalkylene polyamines are the preferred polyamines, with ethylenediamine and hexane-1,6-diamine especially preferred.

The carbonyl-containing compounds useful as blocking agents in the instant invention are the ketones and aldehydes containing up to 20 carbon atoms. Representative ketones are acetone, methyl ethyl ketone, cyclohexanone, diethyl ketone, methyl isobutyl ketone, diisobutyl ketone, ethyl propyl ketone, di-n-propyl ketone, diethyl ketone, methyl isobutyl ketone, methyl isopropyl ketone, methyl octyl ketone, ethyl butyl ketone, methyl phenyl ketone, dioctyl ketone, cyclohexyl methyl ketone, chloroallyl methyl ketone, methoxymethyl butyl ketone, didecyl ketone, and the like. Typical aldehydes include acetaldehyde, pivaldehyde, glutaraldehyde, butyraldehyde, crotonaldehyde, benzaldehyde, propionaldehyde and the like.

The reaction of a diamine with a ketone to produce a diketimine is shown by the specific equation wherein ethylene diamine is reacted with acetone:

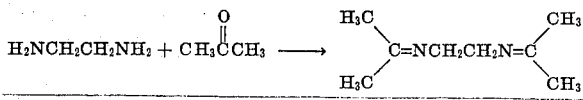

When the ketone is replaced by an aldehyde, as shown with acetaldehyde, a dialdimine is produced:

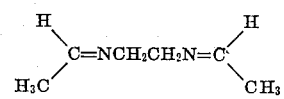

These reactions are known and require no further discussion.

Among the ketimines useful in the instant invention are the diketimine of methyl ethyl ketone and hexane-1,6-diamine produced by the reaction of methyl ethyl ketone and hexane-1,6-diamine which has the formula;

(III) 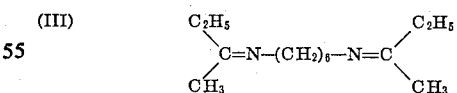

the diketimine of methyl ethyl ketone and bis(6-aminohexyl) ether having the formula:

(IV) 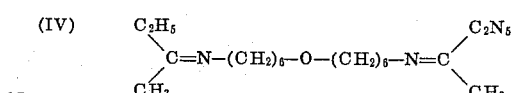

the diketimine and dienamine mixture of cyclohexanone and bis(6-aminohexyl)ether having the formula:

(V) 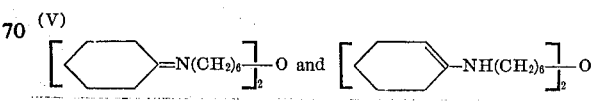

the diketimine of methyl ethyl ketone and tricyclodecane diamine having the structure:

(VI) 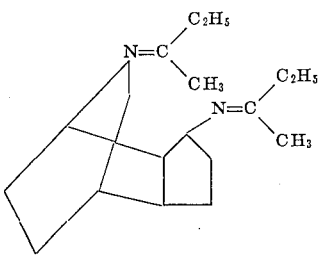

the diketimine of methyl isobutyl ketone and 1,6-hexanediamine; the diketimine of diisobutyl ketone and 1,6-hexanediamine; the diketimine of methyl ethyl ketone and ethylenediamine; the diketimine of methyl ethyl ketone and diethylenetriamine; the diketimine of diisobutylketone and diethylenetriamine; the diketimine of methyl isobutyl ketone and diethylenetriamine; the dialdimine from 1,6-hexanediamine and pivaldehyde; and the like.

The diketimines or dialdimines are conveniently produced by reacting an excess of the ketone or aldehyde compound with the polyamine in an azeotropic solvent and removing water as it is formed. The reaction conditions are known for this known reaction. Generally, a 10 to 100 percent excess of the carbonyl-containing compound, usually a ketone, is utilized.

The polyacetoacetates or polyacetoacetamides useful in the process of the instant invention are known and can be easily formed by the known reaction of diketene with a polyol, polythiol, or polyamine. An alternative method for manufacturing polyacetoacetates, although not as favorable, is via the transesterification of alkyl acetoacetates with polyols.

When the diketene process is employed, it must be remembered that commercial diketene can contain acetic acid and acetic anhydride as impurities and that these compounds should be removed by extraction with a solvent, such as water or toluene, after the ester has been formed since acetic acid is a catalyst for the reaction between acetoacetates and amines. If the acetic acid is not removed, the adhesive or coating composition containing the blocked polyamine and the polyacetoacetate or polyacetoacetamide will have a relatively short pot life, which is undesirable commercially.

As indicated polyacetoacetates or polyacetoacetamides are formed by reacting diketene or an alkyl acetoacetate with a polyol or a polyamide having two or more hydroxyl groups or amino groups. These compounds are well known and any of the known compounds can be used. The preferred are those having up to about 50 carbon atoms and the most preferred contain up to about 15 carbon atoms in the molecule. Illustrative thereof one can mention ethylene glycol, propylene glycol, trimethylol propane, 1,2,6-hexanetriol, diethylene glycol, 2,2'-dihydroxyphenyl propane, pentaerythritol, diethanolamine, triethanolamine, ethylenediamine, diethylenetriamine, 1,6-diaminohexane; polyoxyalkylene polyols formed from the reaction of alkylene oxides and polyhydric alcohols such as the reaction of ethylene oxide or propylene oxide with ethylene glycol; trifunctional products such as those resulting from the reaction of propylene oxide with glycerol; polycaprolactone polyols such as the reaction between propylene glycol and epsilon-caprolactone, and the like.

The coating compositions and adhesive compositions are produced by mixing chemical equivalent amounts of the polyketimine or polyaldimine with the polyacetoacetate or polyacetoacetamide. However, a slight excess, up to about 10 percent, of the polyaceto-acetate or polyacetoacetamide can be used. These compositions are fluid and can be applied by conventional means. They can be diluted with solvents, such as benzene, toluene, acetone, dimethyl ketone, methyl ethyl ketone, and the like, if desired. Any solvent can be used that does not react or in any way unduly retard the final curing reaction. It was found that acetone, in concentrations of about 20 weight percent, serves to prolong the pot life to an unexpected and unobvious extent, often for as much as up to ten times as long a period of time.

The reaction of the components in these coating compositions or adhesive compositions to the polyenamine is caused by the effect that water or atmospheric moisture has on ketimine and aldimine compounds. Water hydrolyzes said compounds to the starting materials from which they were produced. Thus, the polyketimine upon contact with water hydrolyzes to give the starting polyamine and ketone. The freed polyamine is then able to react with the polyacetoacetate or polyacetoacetamide in the coating or adhesive composition and forms the desired polyenamine resin. Since this reaction occurs after the coating or adhesive is applied to the substrate in a relatively thin layer, it is easily controlled. Further, in the absence of moisture, the mixtures are relatively stable and slow reacting.

In another aspect of the invention, it has been found that polyenamines can be effecively prepared from acetoacetate-terminated prepolymers of polyamines by crosslinking said prepolymers by the addition of sufficient polyketimine to react with the terminal acetoacetate groups. In this procedure, polyacetoacetate is initially reacted with less than the stoichiometric amount of polyamine to produce a prepolymer of a molecular weight of from about 500 to about 1,200 or higher containing terminal acetoacetate end groups. The prepolymer is subsequently reacted with a polyketimine to effectively crosslink or complete the formation of the desired polyenamine. The properties of polyenamine coatings prepared via the prepolymer approach compare favorably with those coatings formulated using the "two-package" technique, that is, where both reactants are of low molecular weight, as described supra. The prepolymer is prepared by reacting the polyacetoacetate with sufficient polyamine such that the reaction between the acetoacetate moieties and the amino grouping leaves unreacted acetoacetate moieties in the molecule. For example, when trisacetoacetate of trimethylolpropane is used as the polyacetoacetate for prepolymer formation, it is reacted with approximately one-third of the stoichiometric amount of 1,6-hexanediamine required for a complete reaction. There is no criticality as to the exact amounts of reactions required except that they be other than stoichiometrically equivalent and that there be excess acetoacetate groups. One skilled in the art can manipulate the amounts of reactants depending upon the particular prepolymer desired.

As previously indicated, the addition of solvent to the reactive coatings system has been found to increase the pot life in many of the systems. Common organic solvents such as benzene, acetone, methyl ethyl ketone, toluene, hexane, pentane, ethyl ether, and ethylene glycol monoethyl ether are useful, with acetone being highly preferred. The solvents can be added in amounts up to about 40 percent based upon the weight of the reactants.

Polyenamines made by the process of the instant invention have been found useful as adhesives and particularly useful as adhesives for vinyl substrates due to the evolution of ketones, such as methyl ethyl ketone, when polyenamines are prepared from the reaction of a polyacetoacetate and a polyfunctional ketimine wherein the polyfunctional ketimine is hydrolyzed back to the corresponding polyamine and ketone to allow for reaction between the polyacetoacetate and polyamine. Methyl ethyl ketone, for example, is well-known as a solvent that will attack a vinyl surface and thus help promote adhesion. The amount of ketone released is dependent upon the amounts used of the resin intermediates. By using a higher functionality polyacetoacetate, one is able to obtain a faster cure rate and a lower evolution of ketone, but too much crosslinking is liable to cause poor flexibility in the resultant polyenamine which occasions a loss in the peel strength of the adhesives.

Another limitation upon the use of these polyenamines resins are vinyl adhesives in their release of by-products, namely water and ketone, during cure. For each equivalent of acetoacetate-ketimine reaction approximately one mole of water and one mole of ketone is given off resulting in a considerable loss of the adhesive's original weight. The system thus is preferably used with permeable substrates in order to absorb and dissipate the volatiles.

In many coatings applications, it is desirous to employ a colorless or nearly colorless coating. Color stabilization of the polyenamines produced via the instant process can result by the inclusion of known color stabilizers, such as cuprous acetate, phenothiazine, or mixtures thereof in the coatings composition. These can be present in an amount of from about 0.1 percent, based upon the weight of the resin. Additionally, the inclusion of a poly hindered phenol (such as Irganox 1076) in an amount from about 0.01 to about 10.0 percent, based upon the weight of the total coatings composition will produce colorless or nearly colorless polyenamines.

It has been found that a color problem is more apt to occur when the polyacetoacetates are manufactured via the diketene process. This is apparently due to the formation of polyketenes and dehydroacetic acid during the reaction. Attempts made to solve this problem include the addition of known catalysts during the polyacetoacetate production and the careful feed of diketene to prevent the undue formation of polyketenes. Both of these techniques have worked to minimize color formation.

The polyenamines are characterized by a susceptibility to acid attack, thus tending to limit their utilization when acidity is present. It has been discovered that improved acid resistance is possible by incorporating a silicone component in the polyacetoacetate or acetoacetamide end cap. A silane compound which has been found to be effective in increasing acid resistance is of the formula:

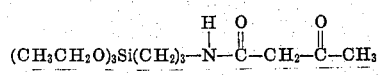

However, due to the monofunctionality of this compound in regard to acetoacetamide units, its effectiveness is somewhat diminished since only a limited amount can be introduced into the coating composition. The effectiveness of the silane compound depends upon a sufficient amount being present to inhibit the wetting of the surface coating by aqueous acids. A preferred difunctional silicon compound is one obtained by the transesterification of neopentyl glycol with dimethyl silicone followed by acetoacetylation via diketene.

The following examples are illustrative of the invention. The first group of examples is directed to the production of the blocked polyamines useful in the invention.

EXAMPLE 1

Diketimine of Methyl Ethyl Ketone and Hexane-1,6-diamine

A mixture of 696 grams of hexane-1,6-diamine, 1,728 grams of methyl ethyl ketone and 121 grams of benzene was placed in a four-necked flask equipped with a thermometer, stirrer, a Dean Stark trap and a nitrogen purge. After heating to approximately 75° C., 600 grams of methyl ethyl ketone and 400 grams of benzene were added and the reaction mixture was refluxed while azeotropically removing water. The reaction was continued for about 24 hours and 216 milliliters of water (the theoretical amount) were removed. The reaction product was stripped free of excess methyl ethyl ketone and benzene at reduced pressure. The residue was fractionally distilled using a 12 inch column packed with glass helices. The diketimine produced was a colorless, very fluid liquid, having a boiling point of 111° C. at 1.05 mm pressure and an N30/D of 1.4583.

EXAMPLE 2

Diketimine from Methyl Isobutyl Ketone and Hexane-1,6-diamine

To an apparatus similar to that described in Example 1 there were charged 232 grams of hexane-1,6-diamine, 800 grams of methyl isobutyl ketone and 52 grams of benzene. After mixing, the reactants were heated to reflux and 70 milliliters of water representing 72 percent of theory were azeotropically removed over a two day period. The remaining benzene and excess methyl isobutyl ketone were removed on a Rinco evaporator to 85° C. and 0.7 mm pressure. The yield of diketimine produced was 511 grams, which is equivalent to a 92 percent of yield.

EXAMPLE 3

Diketimine from Cyclohexanone and Hexane-1,6-diamine

Utilizing equipment and a procedure similar to that described in Example 2, 247 grams of 94 percent pure hexane-1,6-diamine, 402 grams of cyclohexanone, and 200 grams of benzene were mixed together and reacted by heating at reflux. After removal of water and excess cyclohexanone, a 92 percent yield of the diketimine, 508 grams, was recovered.

EXAMPLE 4

Diketimine from Diisobutyl Ketone and Hexane-1,6-diamine

To an apparatus similar to that described in the previous examples there were added 247 grams of 94 percent purity hexane-1,6-diamine, 853 grams of diisobutyl ketone and 100 grams of benzene. Heating, refluxing, and removal of water and excess diisobutyl ketone was carried out in accordance with the procedure outlined in the earlier examples to give 359 grams of diketimine amounting to an 83 percent yield.

EXAMPLE 5

Diketimine from Cyclohexanone and Bis(6-aminohexyl)ether

A charge of 402 grams of cyclohexanone, 432 grams of bis(6-aminohexyl)ether and 200 grams of benzene was added to reaction equipment similar to that described in the previous examples and reacted in a manner as described therein. The diketimine yield was 722 grams, representing a 96 percent theoretical yield. The analysis was as follows: Calculated, %C, 76.60, %H, 11.70, %N, 7.45; Found; %C, 76.43, %H, 11.44, %N, 7.33.

EXAMPLE 6

Diketimine from Methyl Ethyl Ketone and Bis(6-aminohexyl)ether

A mixture of 409 grams of methyl ethyl ketone, 307 grams of bis(6-aminohexyl)ether, and 52 grams of benzene was added to a reaction flask and reacted in a manner similar to that described in the previous examples. Upon completion of the reaction there was recovered 387 grams of diketimine representing an 84 percent theoretical yield. The analysis was as follows: Calculated, % C, 74.07, % H, 12.28, % N, 8.64; Found, % C, 73.84, % H, 12.28, % N, 8.61.

EXAMPLE 7

Diketimine from Methyl Ethyl Ketone and Tricyclodecane diamine

Methyl ethyl ketone in an amount of 144 grams, 83 grams of tricyclodecanediamine and 52 grams of benzene were charged to reaction equipment and reacted in a manner similar to that described in the other examples. The diketimine was recovered in 96 percent yield, weight 131 grams. Analysis: Calculated, %C, 78.83, %H, 10.95, %N, 10.22, Found, %C, 78.90, %H, 10.97, %N, 10.02.

The next group of examples shows the preparation of various acetoacetic acid esters useful in formulating products of the instant invention.

EXAMPLE 8

Ester from Poly(dihydrotricyclodecane) and Ethyl Acetoacetate

Two hundred grams of a polyester prepared by the reaction of 10 equivalents of a polycyclol having the formula:

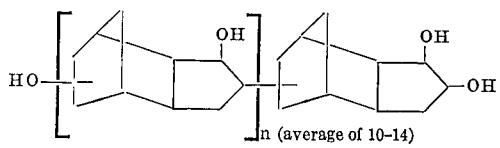

0.5 equivalents of maleic anhydride, and 3.5 equivalents of coconut fatty acids was combined with xylene to form a composition having xylene present in an amount of 49.3 percent by weight. The polyester had 0.562 hydroxyl equivalents per 100 grams thereof. The solution was added to 73 grams of ethyl acetoacetate and the mixture was heated and stirred at 137° to 146° C. while removing ethanol as a distillate. The distillation removed 25 grams of ethanol, 97 percent of the theoretical amount. The polyester was stripped free of xylene and was subsequently used with no further modification. The fluid was a light amber colored liquid barely pourable at room temperature but fluid and easily poured at 90° C.

EXAMPLE 9

Trimethylolpropane Trisacetoacetate

To a 2-liter round-bottomed flask equipped with a stirrer, thermometer, dropping funnel and a condenser with dropping tube there were added 402 grams of trimethylolpropane, 600 milliliters of ethyl acetate and 0.6 gram of triethylenediamine. Then 719 grams of diketene representing 95 percent of theoretical, were added in a dropwise manner over a 105 minute period while stirring and maintaining the reaction temperature at 70°–80° C. Diketene was added at 95 percent of theoretical since higher diketene levels have been noted to substantially increase the color of the resultant product. Stirring and heating were continued for an additional 30 minutes. Thereafter, the solution was cooled, washed with 600 milliliters of water and the remaining ethyl acetate was removed under reduced pressure. The residual liquid was dried by azeotroping off the water with 300 milliliters of benzene and 1,091 grams of trimethylolpropane trisacetoacetate were obtained as a viscous liquid.

EXAMPLE 10

Hexane-1,2,6-triol Trisacetoacetate

One hundred percent pure commercial diketene in a quantity of 126 grams was added to a mixture of 67 grams of 1,2,6-hexanetriol, 0.1 gram of triethylenediamine and 100 milliliters of benzene over a period of 1.5 hours. During the addition the reaction temperature rose from 25°–88° C. The mixture was kept at 88° C. for an additional hour, cooled, extracted with 100 milliliters of a 5 percent sodium bicarbonate solution, and the organic layer was separated and washed with water. The organic layer was dried over magnesium sulfate and the benzene solvent was removed under reduced pressure. A yield of 157 grams of 1,2,6-hexanetriol trisacetoacetate was obtained, representing an 81 percent yield. The structure of the compound was confirmed by infrared and NMR analyses.

EXAMPLE 11

Acetoacetylation of Polyethylene Oxide Glycol

Eighty-four grams of 100 percent pure commercial diketene was added to a mixture of 100 grams of a polyethylene oxide glycol having a molecular weight range of 190–210, 0.1 gram of triethylenediamine and 100 milliliters of toluene over a period of 1.5 hours. During the addition the reaction temperature rose from 25°–64° C. The mixture was then kept at 50°–60 C. for an additional hour, and then the toluene was removed under reduced pressure. A yield of 182 grams of the acetoacetate ester product was obtained, amounting to 99 percent of theoretical.

EXAMPLE 12

Acetoacetylation of Diethylene Glycol

Using a similar procedure and equipment as described in Example 11, 168 grams of 100 percent pure commercial diketene was allowed to react with a mixture of 106 grams of diethylene glycol, 0.1 gram of triethylenediamine, and 100 milliliters of toluene. The acetoacetate ester produced weighed 297 grams, representing 99 percent of the theoretical amount.

EXAMPLE 13

Acetoacetylation of 2,2-bis-4-Hydroxyphenylpropane

Seventeen grams of 100 percent pure commercial diketene was added to a mixture of 22.8 grams of 2,2-bis-4-hydroxyphenylpropane, 0.2 grams of triethylenediamine, and 150 milliliters of toluene at 60°–70° C. over a period of 1 hour. After addition was completed, the mixture was kept at the same temperature for another hour and the toluene was then evaporated under reduced pressure. There was recovered 38 grams of the acetoacetate ester, 96 percent yield, which was identified by spectral analyses as the bisacetoacetate of 2,2-bis-4-hydroxyphenylpropane, having a melting point of 60° – 70° C.

EXAMPLE 14

Pentaerythritol Tetracetoacetate

To a 2-liter four-necked reaction flask equipped with a stirrer, thermometer, dropping funnel and condenser with drying tube they were added 340 grams of pentaerythritol, 0.6 gram of triethylenediamine, and 540 grams of ethyl acetate and the mixture was heated to 50° C. Diketene, with a purity of 96 percent, and weighing 798 grams was added in a dropwise manner while stirring. The addition required 108 minutes and the temperature was maintained at 50°–80° C. The solution was stirred at 70°–80° C. for an additional 3 hours and then for 1 to 1½ hours to cool to 25° C. The solution was given five 750 milliliter washes with water and it was subsequently distilled under reduced pressure to yield 726 grams of the acetoacetate ester as a residue produce present in a 71 percent yield.

The next group of examples show the preparation of polyenamines from the blocked polyamines and polyacetoacetates of the present invention.

EXAMPLE 15

Polyenamine Resin of Trimethylolpropane Trisacetoacetate and the Diketimine of Methyl Ethyl Ketone and Bis(6-aminohexyl)ether Under a nitrogen purge there were mixed 6.45 grams of trimethylolpropane trisacetoacetate and 9.15 grams of the diketimine from methyl ethyl ketone and bis(6-aminohexyl)ether. The mixture was initially cloudy but became homogenous and clear after 19 minutes at room temperature. The solution gelled after standing at room temperature for 6 hours and 40 minutes after mixing. Films were cast on Bonderite No. 37 steel panels 6 hours, 6 hours and 12 minutes and 6 hours and 30 minutes after mixing. All of the films dried to a satisfactory coating.

EXAMPLE 16

To investigate the adhesive properties of polyenamines produced by the instant process, 4.95 grams (0.045 equivalents) of the diketimine of methyl ethyl ketone and 1,6-hexanediamine and 6.45 grams (0.05 equivalents) of the trisacetoacetate of trimethylolpropane were mixed together at room temperature. The composition possessed a pot life of from 5 to 8 hours. The adhesive composition was applied to various substrates and the peel strengths were determined to evaluate the adhesive strength; the results are tabulated below:

| Substrate | Peel Strength, lbs./in.[1] |
|---|---|
| Mylar/Mylar[2] | 0.05 |
| Polyethylene/polyethylene | 0.05 |
| Polyvinyl chloride/polyvinyl chloride[3] | 12.0 |
| Canvas/canvas | 17.0 |
| Polyvinyl chloride/aluminum[4] | 0.04 |
| Mylar/aluminum | 0.05 |
| Polyethylene/aluminum | 0.05 |
| Petina/Petina[5] | 20.0 |
| Vinyl/urethane foam | foam-failure |
| Petina/Petina | 25 Substrate failure |
| Polyvinyl chloride/polyvinyl chloride | 12 substrate failure |
| Polyvinyl chloride/glass | 2 |
| Polyvinyl chloride/steel | 2 |
| Polyvinyl chloride/cardboard | 2 fiber tear |
| Polyvinyl chloride/Luan paneling | 6.8 vinyl failure |
| Polyvinyl chloride/low-density fiberboard | 2.5 |
| Polyvinyl chloride/high-density fiberboard | 3.5 |
| Polyvinyl chloride/molded fiber glass mat | 1.5 |
| Polyvinyl chloride/aluminum (solvent wiped) | 1.5 |
| Petina/Insol leather | 5 |
| Vinyl-coated cloth/vinyl-coated cloth | 20 Substrate failed |
| Polyvinyl chloride/cement | 7.5 |
| Wood/Wood | 100 Wood failure/ qualitative test |

1.- As measured according to ASTM D 903–49T at 73° F.
2.-Polyethyleneterephthalate film
3.-Plasticized film 12 mils thick.
4.5 mil foil.
5. Highly plasticized vinyl shoe upper material (du Pont).

EXAMPLE 17

Another adhesive composition was made by mixing 5.50 grams (0.05 equivalents) of the diketimine of methyl ethyl ketone and 1,6-hexanediamine with 14.14 grams (0.055 equivalents) of the trisacetoacetate of the polyester triol of trimethylol-propane and epsilon-caprolactone wherein the polyester triol has a molecular weight of approximately 540. The adhesive composition had a pot life of from 3 to 4 hours. Use of this composition as an adhesive with various substrates gave the following results:

| Substrate | Peel Strength, lbs./in. |
|---|---|
| Canvas/canvas | 4.5 |
| Petina/Petina | 31 |
| Polyvinyl chloride/polyvinyl chloride | 15 Substrate failure |
| Polyvinyl chloride/aluminum | 0.2 |

While the adhesive composition gelled in approximately 4 hours, complete curve was much slower than with the composition of Example 16. The resin was still tacky 24 hours after application.

EXAMPLE 18

An adhesive composition was prepared using 5.50 grams (0.05 equivalents) of the diketimine of methyl ethyl ketone and 1,6-hexanediamine, 6.43 grams (0.025 equivalents) of the trisacetoacetate of the polyester triol of trimethylol propane and epsilon-caprolactone wherein the polyester triol has a molecular weight of approximately 540, and 3.54 grams (0.03 equivalents) of the tetraacetoacetate of pentaerythritol. It had a pot life of one hour. Use of this composition as an adhesive with various substrates gave the results listed in the following table. The lower peel strength values are explained by the high degrees of stress produced in this rapid curing composition.

| Substrate | Peel Strength, lbs./in. |
|---|---|
| Polyvinyl chloride/polyvinyl chloride | 3.5 |
| Petina/Petina | 7.0 |
| Polyvinyl chloride/aluminum | 0.5 |

What is claimed is:

1. A method for the production of polyenamines which comprises contacting a mixture of approximately chemically equivalent amounts of (a) a member of the group consisting of a ketimine and an aldimine with (b) a member of the group of consisting polyacetoacetates and polyacetoacetamides with water so as to hydrolyze said ketimine or aldimine in said mixture to the original starting polyamine and ketone or aldehyde whereby the freed polyamine reacts with the polyacetoacetate or polyacetoacetamide in said mixture and produces said polyenamine, said ketimine or aldimine being the reaction product of a polyamine of the formula:

$$HR''NR'(NR''H)_n$$

wherein R' is alkylene, cycloalkylene, arylene, arylalkylene, cycloalkylalkylene, alkylcycloalkylene, alkylarylene or the ethers thereof of from one to 50 carbon atoms, R'' is hydrogen or alkyl of from one to six carbon atoms and n has a value of from 1 to 3, with a carbonyl-containing compound of the group consisting of monoketones and monoaldehydes containing up to 20 carbon atoms, and said mixture being produced by adding said ketimine or said aldimine to the said polyacetoacetate or the said polyacetoacetamide as hereinabove stated.

2. The method as claimed in claim 1, wherein the polyenamine contains units of the formula:

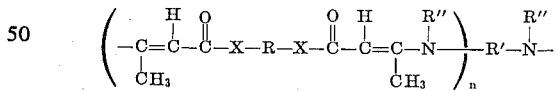

wherein R' is alkylene, cycloalkylene, arylene, arylalkylene, cycloalkylalkylene, alkylcycloalkylene, alkylarylene or the ethers thereof of from one to 50 carbon atoms, R'' is hydrogen or alkyl of from one to six carbon atoms and n has a value of from 1 to 3, R represents the base residue of the polyacetoacetate or polyacetoacetamide and X is oxygen or nitrogen.

3. The method as claimed in claim 1, wherein acetone is added as a solvent in step (ii).

4. The method as claimed in claim 1, wherein the polyamine is bis(6-aminohexyl)ether, the carbonyl-containing compound is methyl ethyl ketone and the polyacetoacetate is trimethylolpropane trisacetoacetate.

5. The method as claimed in claim 1, wherein the polyamine is 1,6-hexanediamine, the carbonyl-containing compound is methyl ethyl ketone and the polyacetoacetate is trimethylolpropane trisacetoacetate.

6. The method as claimed in claim 1, wherein the polyamine is 1,6-hexanediamine, the carbonyl-containing compound is methyl ethyl ketone and the polyacetoacetate is the polyester triol of trimethylolpropane and epsilon-caprolactone having an average molecular weight of about 540.

* * * * *